US012768207B2

(12) United States Patent
Wang

(10) Patent No.: US 12,768,207 B2
(45) Date of Patent: Oct. 20, 2026

(54) DOOR LOCK ASSEMBLY

(71) Applicant: ILLINOIS TOOL WORKS INC., Glenview, IL (US)

(72) Inventor: Yang Wang, Dongguan City (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 33 days.

(21) Appl. No.: 18/925,702

(22) Filed: Oct. 24, 2024

(65) Prior Publication Data

US 2025/0129645 A1 Apr. 24, 2025

(30) Foreign Application Priority Data

Oct. 24, 2023 (CN) ........................ 202311385312.4

(51) Int. Cl.
*E05C 3/00* (2006.01)
*D06F 58/20* (2006.01)
*E05C 3/12* (2006.01)

(52) U.S. Cl.
CPC .............. *E05C 3/004* (2013.01); *D06F 58/20* (2013.01); *E05C 3/12* (2013.01)

(58) Field of Classification Search
CPC ... E05C 3/004; E05C 3/12; E05C 3/24; E05C 19/022; E05C 19/024; D06F 58/20;
(Continued)

(56) References Cited

U.S. PATENT DOCUMENTS 10,829,881 B2 * 11/2020 Choi ..................... E05C 19/022
11,519,125 B2 * 12/2022 Wang .................... E05C 19/024
12,410,549 B2 * 9/2025 Lim ........................ D06F 39/14

FOREIGN PATENT DOCUMENTS

CN 104929438 A * 9/2015 ............. D06F 39/14
CN 105442257 A * 3/2016 ............. D06F 37/42
(Continued)

OTHER PUBLICATIONS

CN113914074A Espacenet machine translation of claims and description (Year: 2026).*
(Continued)

*Primary Examiner* — Steven A Tullia
(74) *Attorney, Agent, or Firm* — Pauley Erickson & Swanson

(57) ABSTRACT

A door lock assembly, including a cam, a slider and a pin assembly. The cam can rotate clockwise or counterclockwise about a camshaft, and the slider fits and engages with the cam, so when the cam rotates, the slider reciprocates in the length direction of the slider with the rotation. The slider is provided with a movement guide groove which defines a conventional movement path including a first and second segment of the conventional movement path. An end of the pin assembly can move relative to the slider in the conventional movement path with the reciprocation of the slider. The movement guide groove further defines an alternative movement path, and the end of the pin assembly can move relative to the slider in the first segment of the conventional movement path and the alternative movement path defined by the movement guide groove with the reciprocation of the slider, but does not move in the second segment of the conventional movement path.

20 Claims, 15 Drawing Sheets

(58) Field of Classification Search
CPC ...... D06F 37/42; D06F 39/14; E05B 47/0603; E05B 63/22; E05B 63/0065; E05B 63/248; E05B 15/0295; E05B 15/00; E05B 15/0205; E05B 15/10; E05B 65/00; Y10T 292/1062; Y10S 292/04
See application file for complete search history.

(56) References Cited

FOREIGN PATENT DOCUMENTS

| | | | | | |
|---|---|---|---|---|---|
| CN | 107587794 | A | | 1/2018 | |
| CN | 109487510 | A | * | 3/2019 | D06F 39/14 |
| CN | 106048982 | B | * | 4/2019 | D06F 37/42 |
| CN | 110080631 | A | * | 8/2019 | E05B 65/00 |
| CN | 209556617 | U | * | 10/2019 | E05C 19/02 |
| CN | 110984703 | A | * | 4/2020 | D06F 37/42 |
| CN | 111946148 | A | * | 11/2020 | E05B 15/00 |
| CN | 112576112 | A | * | 3/2021 | E05F 15/611 |
| CN | 110984703 | B | * | 4/2021 | D06F 39/14 |
| CN | 113323509 | A | * | 8/2021 | E05B 47/0603 |
| CN | 113914074 | A | * | 1/2022 | D06F 37/42 |
| FR | 2585060 | A1 | * | 1/1987 | E05C 19/022 |
| JP | 1992 064677 | A | | 2/1992 | |
| JP | 04064677 | A | * | 2/1992 | E05C 19/02 |
| JP | 2549781 | Y2 | * | 9/1997 | H01H 13/56 |
| JP | 2912428 | B2 | * | 6/1999 | E05C 19/02 |
| JP | 2019 528093 | A | | 10/2019 | |
| JP | 7227164 | B2 | * | 2/2023 | A47L 15/4259 |
| KR | 20030084376 | A | * | 11/2003 | D06F 37/42 |
| KR | 20140098956 | A | * | 8/2014 | D06F 37/10 |
| KR | 101855470 | B1 | * | 7/2018 | D06F 39/14 |
| WO | WO-2018006790 | A1 | * | 1/2018 | E05B 63/22 |
| WO | WO-2021246619 | A1 | * | 12/2021 | E05C 19/022 |

OTHER PUBLICATIONS

FR258060A1 Espacenet machine translation of claims and description (Year: 2026).*

JPH0464677A Espacenet machine translation of claims and description (Year: 2026).*

JPO, Japan Patent Office, Japanese Office Action, in the Japanese Language, for Japanese Patent Application No. JP2024-186512, issued Aug. 26, 2025 (3 pages).

* cited by examiner

DOOR LOCK ASSEMBLY

CROSS-REFERENCE TO RELATED APPLICATIONS

Chinese Patent Applications CN 2023113853124, filed on 24 Oct. 2023, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present disclosure relates to a door lock assembly, and in particular to a door lock assembly for opening a door of an electrical apparatus in various ways.

Discussion of Related Art

Door lock assemblies may be used for locking or opening doors of electrical apparatuses (such as a dryer, a washing machine, or a dishwasher). To operate normally, the electrical apparatuses have many requirements for the door lock assemblies of the apparatuses. For example, it is necessary to provide users with various convenient ways of opening the doors of electrical apparatuses while ensuring the reliable operation of the electrical apparatuses in various states.

SUMMARY OF THE INVENTION

The present disclosure provides a door lock assembly, which enables a user to close and open a door not only in a push-push way from the outside of the door, but also in a push-pull way. In a door-closed (locked) state, the door can also be pushed open from the inside of the door.

According to a first aspect of the present disclosure, a door lock assembly is provided. The door lock assembly is configured to lock a door of an electrical apparatus, and includes: a cam, a slider, and a pin assembly, wherein the cam is configured to rotate clockwise or counterclockwise about a camshaft; the slider is configured to fit and engage with the cam, such that when the cam rotates clockwise or counterclockwise, the slider can reciprocate in the length direction of the slider with the rotation of the cam, wherein the slider is provided with a movement guide groove defining a conventional movement path, and the conventional movement path includes a first segment of the conventional movement path and a second segment of the conventional movement path, which are connected to each other; and the pin assembly is configured such that an end of the pin assembly can move relative to the slider in the conventional movement path defined by the movement guide groove along with the reciprocation of the slider; wherein the movement guide groove further defines an alternative movement path, and the pin assembly is further configured such that the end of the pin assembly can move relative to the slider in the first segment of the conventional movement path and the alternative movement path defined by the movement guide groove with the reciprocation of the slider, but does not move in the second segment of the conventional movement path.

According to the first aspect of the present disclosure, the movement guide groove is a heart-shaped guide groove, and the conventional movement path is a heart-shaped movement path, four path points being provided on the heart-shaped movement path, and sequentially including: a heart bottom intersection A, a heart first side path vertex B, a heart upper intersection C, and a hear second side path vertex D; wherein the alternative movement path is disposed between the heart upper intersection C and the heart bottom intersection A, such that the pin assembly can directly move from the heart upper intersection C to the heart bottom intersection A without passing through the heart second side path vertex D.

According to the first aspect of the present disclosure, the first segment of the conventional movement path is a heart first side path, and the second segment of the conventional movement path is a heart second side path; wherein the heart first side path is formed from the heart bottom intersection A to the heart upper intersection C through the heart first side path vertex B, the heart second side path (CDA) is formed from the heart upper intersection C to the heart bottom intersection A through the heart second side path vertex D, the heart first side path and the heart second side path (CDA) are out-protruding movement paths, the heat first side path vertex B and the heart second side path vertex D are respectively the highest protruding points of the heart first side path and the heart second side path (CDA), and concaved paths are formed from the heart first side path vertex B to the heart upper intersection C, and from the heart upper intersection C to the heart second side path vertex D.

According to the first aspect of the present disclosure, the heart-shaped movement path is a unidirectional movement path, and the movement in the heart-shaped movement path sequentially passes through the heart bottom intersection A, the heart first side path vertex B, the heart upper intersection C, and the heart second side path vertex D, and finally returns to the heart bottom intersection A.

According to the first aspect of the present disclosure, the pin assembly is located at the heart bottom intersection A when the door is in an open position; the pin assembly is located at the heart upper intersection C when the door is in a closed position; and the pin assembly is located at the heart first side path vertex B or the heart second side path vertex D when a door hook of the door is in the maximum insertion position; wherein the pin assembly moves from the upper bottom intersection A to the heart first side path vertex B and the door hook moves to the maximum insertion position when the door is subjected to a first inward force in the open position; the pin assembly moves from the heart first side path vertex B to the heart upper intersection point C and the door moves to the closed position after the first inward force is removed; the pin assembly moves from the heart upper intersection C to the heart second side path vertex D and the door hook moves again to the maximum insertion position when the door is subjected to a second inward force in the closed position; and the pin assembly moves from the heart second side path vertex D back to the heart bottom intersection A, and the door returns to the open position after the second inward force is removed.

According to the first aspect of the present disclosure, the alternative movement path is a release guide groove provided on the slider.

According to the first aspect of the present disclosure, the diameter of the end of the pin assembly is greater than the groove width of the release guide groove, and when the door is in the closed position and subjected to an outward force, the pin assembly is configured to apply a compressive force to two side walls of the release guide groove, thereby expanding the release guide groove in the groove width direction, such that the pin assembly can move in the release guide groove from the heart upper intersection C to the heart bottom intersection A.

According to the first aspect of the present disclosure, when the door is in the closed position and subjected to an outward force, the door hook of the door pulling the cam outwardly makes the cam have a trend to rotate counterclockwise, thereby driving the slider to trend to move in a first direction, so that the pin assembly can compress the release guide groove of the slider at the heart upper intersection C, enabling the pin assembly to compress the release guide groove of the slider toward the heart bottom intersection A, thereby transferring into a compressive force toward the two side walls of the release guide groove, the compressive force compresses to expand the groove width of the release guide groove to be sufficient to accommodate the end of the pin assembly, so that the slider can move relative to the pin assembly in the first direction, without blocking the counterclockwise rotation of the cam, ultimately allowing the door to open, and at the same time, the pin assembly moves in the release guide groove of the slider from the heart upper intersection C to the heart bottom intersection A.

According to the first aspect of the present disclosure, the release guide groove is a hollow groove or a non-hollow groove.

According to the first aspect of the present disclosure, the release guide groove is a linear guide groove.

According to the first aspect of the present disclosure, the release guide groove is provided with a baffle near the heart upper intersection C, and the pin assembly is configured to apply force to the baffle, wherein the baffle is destroyed when the force applied to the baffle exceeds a threshold that the baffle can withstand, such that the pin assembly can move in the release guide groove from the heart upper intersection C to the heart bottom intersection A.

According to the first aspect of the present disclosure, the door lock assembly further includes a housing, wherein the cam, the slider and the pin assembly are disposed inside the housing.

According to the first aspect of the present disclosure, the pin assembly includes a pin housing and a pin, a portion of the pin is accommodated in the pin housing, and the bottom end of the pin protrudes from the bottom of the pin housing, wherein the pin is configured to move in the heart-shaped movement path.

According to the first aspect of the present disclosure, the housing has a pin cavity, in which the pin housing is accommodated, wherein the pin cavity is configured to restrict the movement of the pin assembly within the pin cavity in the length direction of the slider, but allow the pin assembly to move within the pin cavity in the width direction of the slider.

According to the first aspect of the present disclosure, the cam includes a lock hook configured to engage with the door hook so as to lock the door hook, and the door hook is mounted on the door; wherein the door hook is configured to engage with or disengage from the lock hook when the door is closed or opened, thereby allowing the cam to rotate clockwise or counterclockwise.

According to the first aspect of the present disclosure, the housing is provided with a locking hole, and the door hook passes through the locking hole to engage with the lock hook.

According to the first aspect of the present disclosure, the door lock assembly further includes: a micro-switch arranged in the housing. The micro-switch is in an off state when the door is in the open position; the pin moves along the first side path from the heart bottom intersection A to the heart upper intersection C and the micro-switch is turned on during the course of closing the door; and the pin moves along the second side path from the heart upper intersection C to the heart bottom intersection A and the micro-switch is turned off during the course of opening the door.

According to the first aspect of the present disclosure, the slider has a micro-switch actuating part disposed at one end thereof, wherein the clockwise rotation of the cam causes the movement of the slider in a second direction to be unblocked during the course of closing the door, thereby enabling the slider to move in the second direction, causing the micro-switch actuating part to trigger the micro-switch, thereby enabling the micro-switch to be turned on; or the counterclockwise rotation of the cam drives the slider to move in the first direction during the course of opening the door, causing the micro-switch actuating part to disengage from the micro-switch, thereby enabling the micros-switch to be turned off.

According to the first aspect of the present disclosure, the door lock assembly further includes: a cam torsion spring configured to engage with the cam to provide a driving force driving the cam to rotate counterclockwise, and a slider spring configured to engage with the slider to provide a driving force driving the slider to move in the second direction.

According to the first aspect of the present disclosure, the electrical apparatus is a dryer.

Some of the additional aspects and advantages of the present disclosure will be set forth in the following description, and some will become apparent from the following description, or be learned by practice of the present disclosure.

DESCRIPTION OF PREFERRED EMBODIMENTS

Figure 1A:
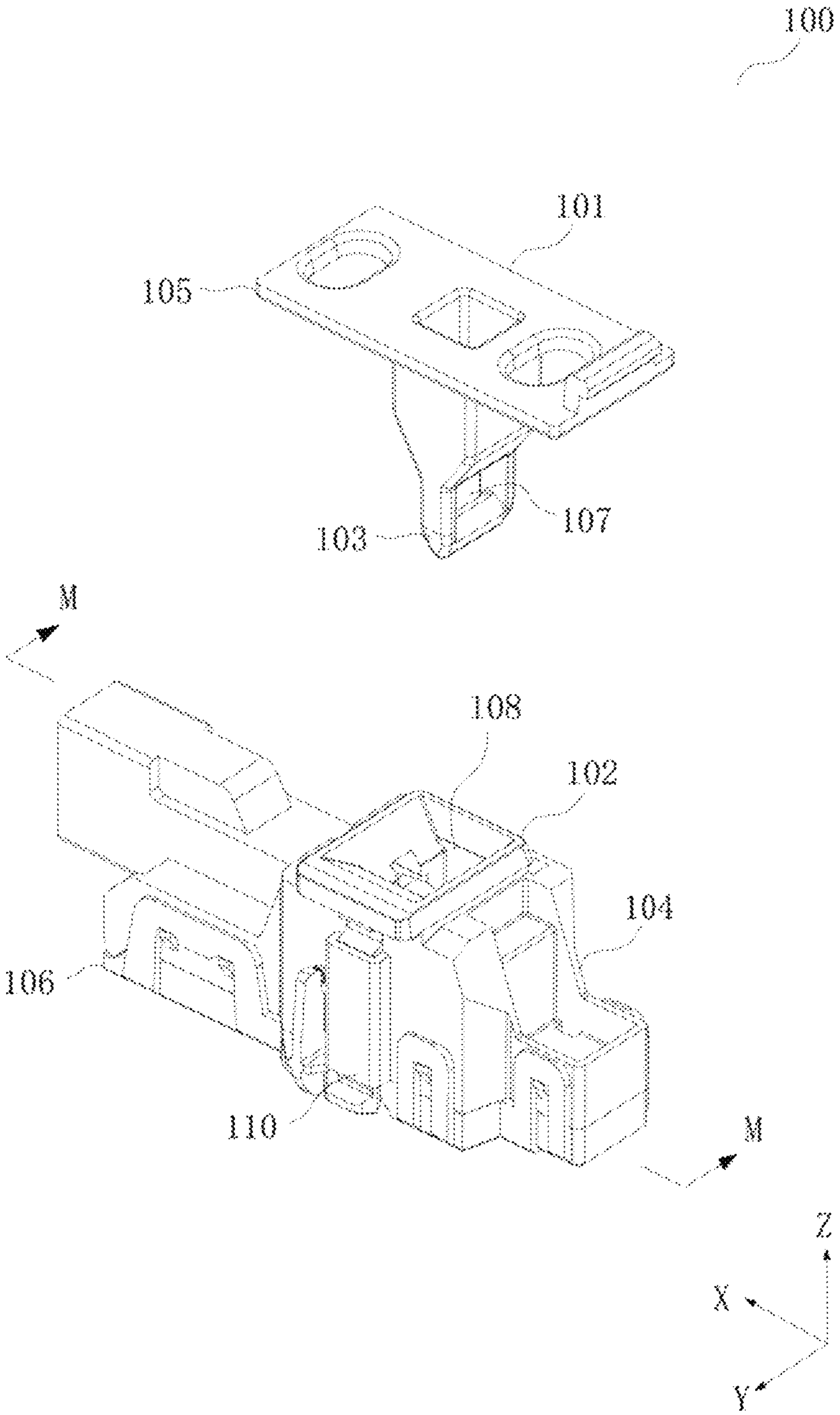
FIG. 1A is a perspective view of a door lock assembly according to the present disclosure.

Various specific embodiments of the present disclosure will be described below with reference to the accompanying drawings which constitute part of the present disclosure, but the embodiments would not limit the scope of the present disclosure. It should be understood that although the terms such as "upper", "lower", "left", "right", "front", "rear" and so on indicating directions are used in the present disclosure to describe orientations of various illustrative structural parts and elements in the present disclosure, the terms used herein are merely used for ease of description and are determined based on the illustrative orientation shown in the accompanying drawings. Since the embodiments disclosed in the present disclosure can be arranged in different orientations, the terms indicating directions are merely illustrative and should not be considered as limitations.

The term "comprise/include" and derivatives thereof mean inclusion without limitation. Unless otherwise specified and limited, the terms "mounting", "assembling" "connecting", "connection" and their variants should be understood broadly. For example, they may be a mechanical or electrical connection, internal communication between two elements, or a direct connection or indirect connection via an intermediate medium. For those of ordinary skills in the art, the specific meanings of the above terms can be understood according to specific cases. If possible, the same or similar reference numerals used in the present disclosure refer to the same components.

In order to make the description of the present disclosure easy to understand, a door of an electrical apparatus (especially a door of a dryer) according to the present disclosure has at least three positions, namely: an open position (see the relative position between the door hook 101 and the door lock box shown in FIGS. 4A and 4B and FIGS. 5A and 5B), a closed position (see the relative position between the door hook 101 and the door lock box shown in FIGS. 7A and 7B and FIGS. 9A and 9B), and a maximum insertion position of the door hook (see the relative position between the door hook 101 and the door lock box shown in FIGS. 6A and 6B and FIGS. 8A and 8B). The open position of the door is a position of the door where the electrical apparatus is in a non-operating state, the closed position of the door is a position of the door where the electrical apparatus is in a normal operating state, and the maximum insertion position of the door hook is an intermediate position of the door hook or the door during the course of opening or closing the door.

Figure 1B:
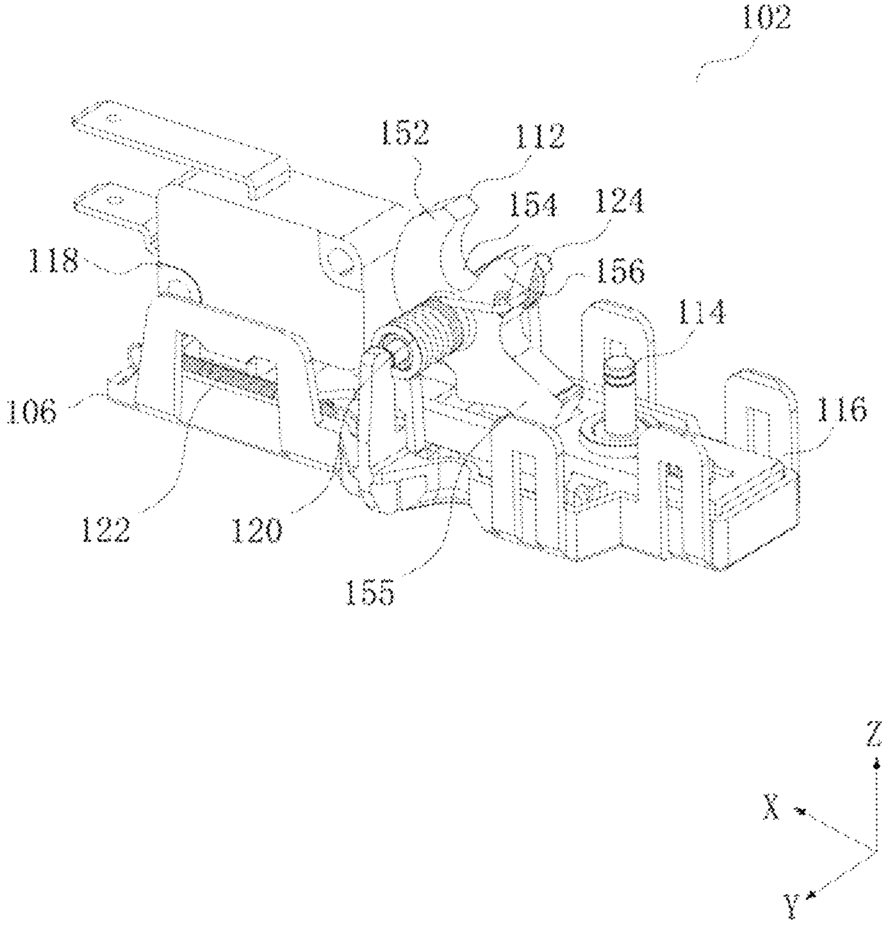
FIG. 1B is a perspective view of a door lock box of the door lock assembly shown in FIG. 1A, in which a door lock box upper cover is omitted for showing more components inside the door lock box.
Figure 1C:
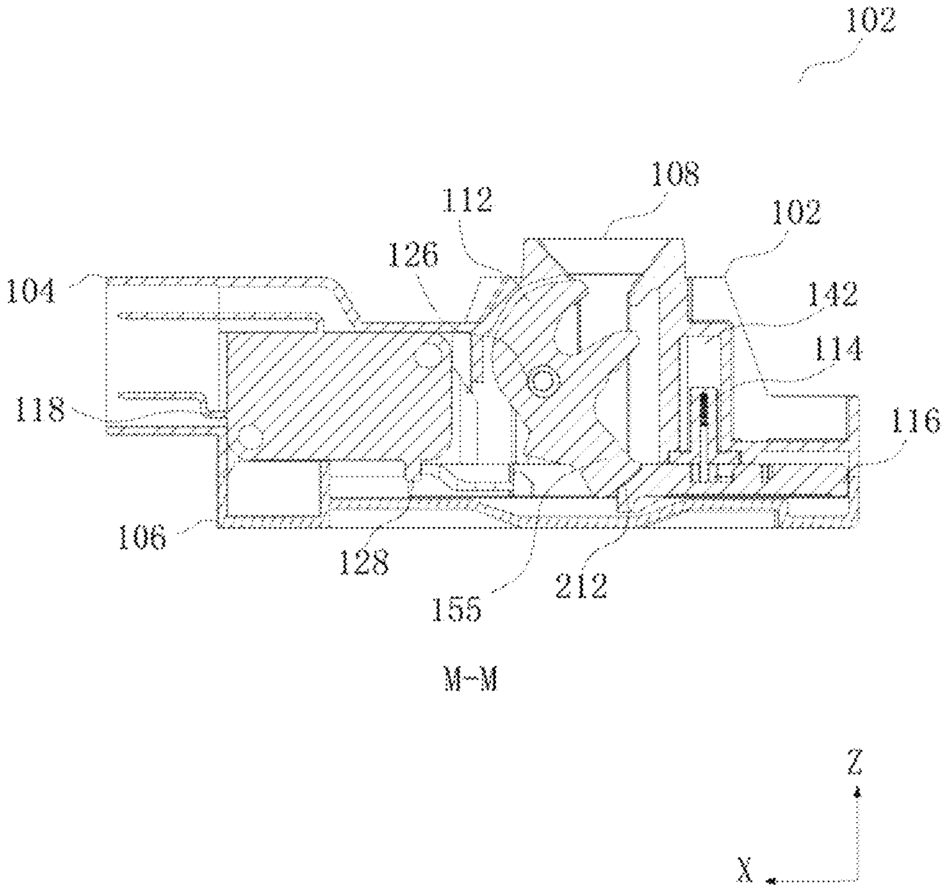
FIG. 1C is a cross-sectional view of the door lock assembly shown in FIG. 1A in the M-M direction.
Figure 1D:
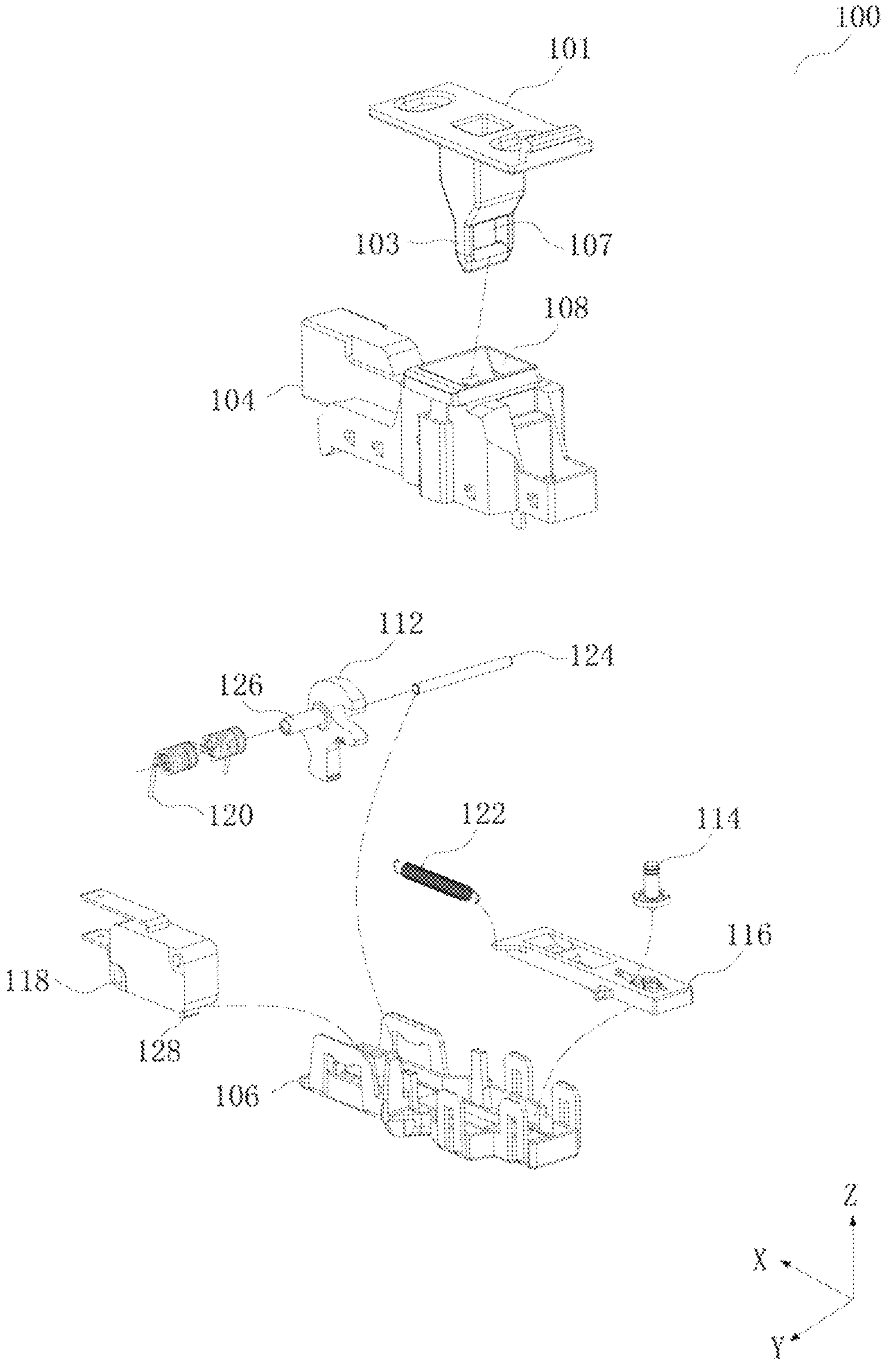
FIG. 1D is an exploded view showing the assembling of the door lock assembly shown in FIG. 1A.

FIGS. 1A-1D are schematic views of a door lock assembly 100 of the present disclosure, viewed from different perspectives. In these drawings, FIG. 1B shows more components inside the door lock box 102 by omitting the door hook 101 and a door lock box upper cover 104 in FIG. 1A; FIG. 1C is a cross-sectional view of the door lock assembly 100 of FIG. 1A in the M-M direction, for showing a configuration and fit relationship of a pin assembly 114 and a pin cavity 142 inside the door lock box 102; and FIG. 1D is an exploded view showing the assembling of the door lock assembly 100 shown in FIG. 1A, for showing an assembly relationship between the components of the door lock assembly 100. It should be noted that in this text below, in order to clearly show a positional relationship of the door lock box 102 and the components, the length direction of the door lock box 102 is defined as an X direction, the width direction of the door lock box 102 is defined as a Y direction, and the height direction of the door lock box 102 is defined as a Z direction. Since the embodiments disclosed in the present disclosure can be arranged in different orientations, the terms X, Y and Z indicating directions are merely used for the illustrative purpose and should not be considered as limitations.

As shown in FIG. 1A, the door lock assembly 100 includes the door lock box 102. The door lock box 102 has the door lock box upper cover 104 and a door lock box base 106 that are connected together by means of a securing device 110 (e.g., a latch). The door lock box upper cover 104 is provided with a door locking hole 108 which is configured to accommodate the door hook 101 mounted on the door of the electrical apparatus. The door hook 101 is located above the door locking hole 108. When the door hook 101 is inserted into the interior of the door lock assembly 100 through the door locking hole 108 in the door lock box 102, the door hook 101 engages with a cam (see a cam 112 in FIG. 1B) inside the door lock assembly 100. When the cam 112 is locked, and the door of the electrical apparatus is locked accordingly.

Specifically, the door hook 101 has a door hook base 105 and a door hook head 103. The door hook base 105 is mounted on the door of the electrical apparatus, and the door hook head 103 is provided with a door hook hole 107 configured to engage with the cam (see the cam 112 in FIG. 1B). When the cam 112 is locked, the door hook hole 107 in the door hook head 103 is locked by the cam 112. As a result, the door hook 101 cannot move, thereby locking the door of the electrical apparatus.

As shown in FIGS. 1B and 1D, a slider 116, the pin assembly 114, the cam 112 and a micro-switch 118 are sequentially disposed inside the door lock box 102 in the length direction (X direction). The slider 116 is limited to reciprocate inside the door lock box 102 in the length direction (X direction) and cannot move in the width direction (Y direction); and the pin assembly 114 is limited to reciprocate inside the door lock box 102 in the width direction (Y direction), and cannot move in the length direction (X direction). The cam 112 has a cam rotation shaft 124 disposed in the width direction (Y direction), such that the cam 112 can rotate clockwise or counterclockwise about the cam rotation shaft 124.

As shown in FIG. 1B, the cam 112 has a lock hook configured to fit with the door hook 101 to lock the door hook 101 and a slider actuating part 155 configured to actuate the slider 116. The lock hook has an upper lock hook 152, a lower lock hook 156, and a lock hook cavity 154. As the door is being closed or opened, the door hook 101 could engage with or disengage from the lock hook, thereby causing the cam 112 to rotate clockwise or counterclockwise. Specifically, when the door is being closed, the door hook head 103 of the door hook 101 hits downwardly against the lower lock hook 156, causing the cam 112 to rotate clockwise. Thus, the upper lock hook 152 can rotate into the door hook hole 107 of the door hook 101 to engage with the door hook 101, and at the same time, a lower end of the door hook 101 is located in the lock hook cavity 154 to engage with the cam 112. If the cam 112 is locked, the door hook hole 107 in the door hook head 103 is locked by the upper lock hook 152 of the cam 112, preventing the door hook 101 from moving and thus locking the door of the electrical apparatus. When the door is being opened, the door hook head 103 of the door hook 101 pulls the upper lock hook 152 upwardly in the lock hook cavity 154, causing the cam 112 to rotate counterclockwise, thereby releasing the door hook 101 from the lock hook cavity 154.

With continued reference to FIGS. 1B and 1D, a slider spring 122 and a cam torsion spring 120 are further provided inside the door lock box 102. The cam 112 and the cam torsion spring 120 are sleeved on a torsion spring sleeve 126 coaxially arranged with the cam rotation shaft 124 to ensure smooth rotation. The slider spring 122 is connected to the slider 116 at one end, and is connected to the left end of the door lock box base 106 at the other end. When the slider 116 moves rightward in the length direction of the door lock box 102 to tension the slider spring 122, the slider spring 122 can provide the slider 116 with a pulling force (restoring force) of, for example, 2 Newtons, for moving the slider 116 leftward in the length direction of the door lock box 102.

The cam torsion spring 120 is connected to the lower lock hook 156 of the cam 112 at one end, and is fixed to the door lock box base 106 at the other end. When the cam 112 rotates clockwise about the cam rotation shaft 124 and drives the cam torsion spring 120 to rotate clockwise, the cam torsion spring 120 can provide a torsional force (restoring force) for rotating the cam 112 counterclockwise.

FIG. 1C is a cross-sectional view of the door lock assembly 100 of FIG. 1A in the M-M direction, showing the configuration and the fit relationship of the pin assembly 114 and the pin cavity 142 inside the door lock box 102.

As shown in FIG. 1C, the pin cavity 142 for accommodating the pin assembly 114 is provided inside the door lock box upper cover 104. The pin cavity 142 can restrict the movement of the pin assembly 114 within the pin cavity 142 in the length direction (X direction) of the slider 116, but allow the pin assembly 114 to move within the pin cavity 142 in the width direction (Y direction) of the slider 116.

Specifically, since the slider 116 is provided with a heart-shaped guide groove 202 (see FIGS. 2A and 2B), the pin assembly 114 can slide relative to the slider 116 in the heart-shaped guide groove 202 along a groove track of the heart-shaped guide groove 202. The groove track of the heart-shaped guide groove 202 defines two movement directions of X and Y. When the pin assembly 114 moves relative to the slider 116 in the heart-shaped guide groove 202 in the X direction, the pin assembly 114 does not move itself relative to the door lock box 102 (the door lock box upper cover 104) in the X direction, but the slider 116 moves relative to the door lock box 102 (the door lock box upper cover 104) in the X direction, which is thus manifested as the pin assembly 114 moving relative to the slider 116 in the X direction.

With continued reference to FIGS. 1C and 1D, the micro-switch 118 is configured to control the on and off of the electrical apparatus and has a switch contact 128. When the slider 116 moves leftward in the length direction of the door lock box 102 to a left end position, the slider 116 can trigger the switch contact 128 to turn on the micro-switch 118, and thus the electrical apparatus is powered on; and when the slider 116 moves rightward in the length direction of the door lock box 102 to a right end position, the slider 116 is out of contact with the switch contact 128 to turn off the micro-switch 118, and thus the electrical apparatus is powered off.

Figure 2A:
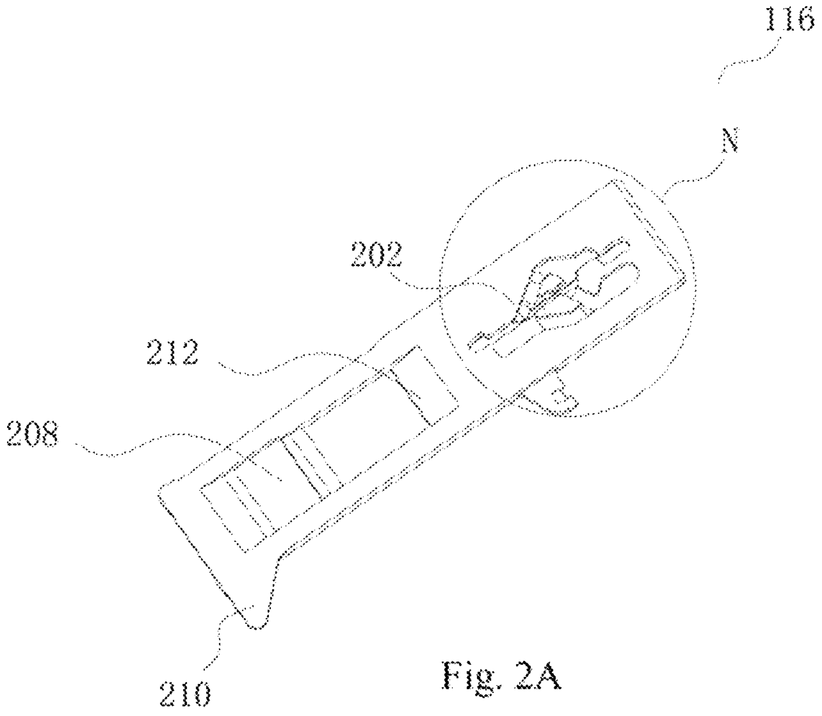
FIG. 2A is a perspective view of a slider in the door lock box.
Figure 2B:
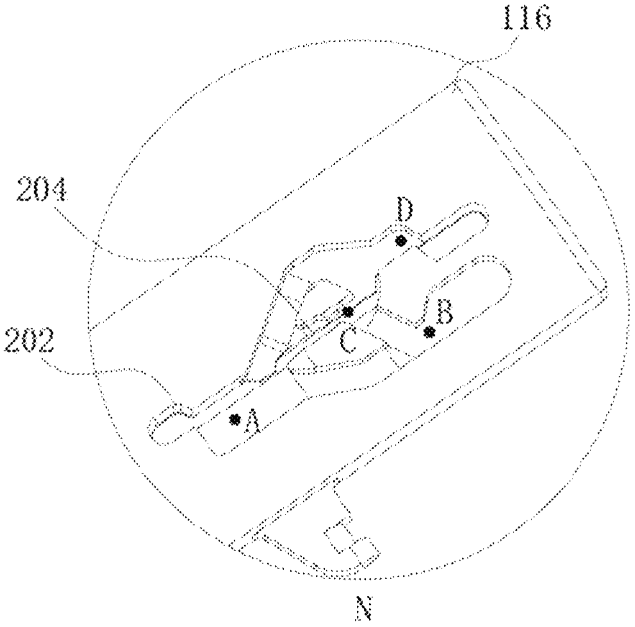
FIG. 2B is an enlarged view of the portion N of the slider shown in FIG. 2A.

FIG. 2A is a perspective view of the slider 116 in the door lock box 102, and FIG. 2B is an enlarged view of the portion N of the slider 116 shown in FIG. 2A.

As shown in FIGS. 2A and 2B, the slider 116 is in an elongated shape, and is provided with the heart-shaped guide groove 202, a cam abutment part 212, the micro-switch actuating part 208 and a spring fixing part 210 on an upper surface of the slider 116. As shown in FIG. 2B, the heart-shaped guide groove 202 defines a unidirectional heart-shaped movement path ABCDA. The heart-shaped movement path ABCDA is provided with four path points, including a heart bottom intersection A, a heart upper intersection C, a heart first side path vertex B, and a heart second side path vertex D. The heart-shaped movement path ABCDA includes a heart first side path ABC and a heart second side path CDA. The heart first side path ABC is formed from the heart bottom intersection A to the heart upper intersection C through the heart first side path vertex B. The heart second side path CDA is formed from the heart upper intersection C to the heart bottom intersection A through the heart second side path vertex D. The heart first side path ABC and the heart second side path CDA are paths protruding outwardly such that the heart first side path vertex B and the heart second side path vertex D are protruding and are respectively the outmost points of the heart first side path (ABC) and the heart second side path (CDA), and concaved paths are formed from the heart first side path vertex B to the heart upper intersection C, and from the heart upper intersection C to the heart second side path vertex D.

It should be noted that in order to ensure that the heart-shaped movement path ABCDA is a unidirectional movement path, the heart first side path vertex B is located higher than the heart upper intersection C, thereby ensuring an unidirectional movement of the pin assembly 114 from point B to point C when no external force is applied. During the movement of the pin assembly 114 in the heart-shaped movement path ABCDA, the pin assembly 114 passes in sequence through the heart bottom intersection A, the heart first side path vertex B, the heart upper intersection C and the heart second side path vertex D, and finally returns to the heat bottom intersection A.

With continued reference to FIG. 2B, an alternative movement path CA is further provided between the heart upper intersection C and the heart bottom intersection A, serving as a release guide groove 204 provided in the slider 116. The pin assembly 114 has a diameter at its bottom end greater than the width of the release guide groove 204, so that the pin assembly 114 cannot move through the release guide groove 204 without a significant compressive force between the pin assembly 114 and the release guide groove 204. Put it differently, the alternative movement path CA is not a passable path if there is no significant compressive force between the pin assembly 114 and the release guide groove 204. However, if the compressive force between the pin assembly 114 and the release guide groove 204 is greater than a predetermined threshold (e.g., exceeding 55 Newtons), the pin assembly 114 could apply a compressive force to the two side walls of the release guide groove 204. This causes the release guide groove 204 to deform and expand in the groove width direction, thereby allowing the pin assembly 114 to directly move in the release guide groove 204 from the heart upper intersection C to the heart bottom intersection A, without being limited to move in the heart-shaped movement path ABCDA. That is to say, the pin assembly 114 can move through the alternative movement path CA if the compressive force between the pin assembly 114 and the release guide groove 204 is greater than the predetermined threshold.

With continued reference to FIGS. 2A and 1C, the cam abutment part 212 of the slider 116 could abut against and fit with the slider actuating part 155 of the cam 112. When the door is being opened, the cam 112 rotates counterclockwise. Since the slider actuating part 155 of the cam 112 abuts against the cam abutment part 212 of the slider 116, the cam 112 pushes and moves the slider 116 rightward, thereby tensioning the slider spring 122 rightward. The micro-switch actuating part 208 of the slider 116 moves out of contact with the switch contact 128 to turn off the micro-switch 118, and thus the electrical apparatus is powered off. When the door is being closed, the cam 112 rotates clockwise. Thus, the slider actuating part 155 of the cam 112 has a trend to be out of abutment with the cam abutment part 212 of the slider 116, and thereby the slider 116 moving leftward under the action of a tensile force of the slider spring 122. The micro-switch actuating part 208 of the slider 116 can trigger the switch contact 128 to turn on the micro-switch 118, and thus the electrical apparatus is powered on. Specifically, the slider spring 122 is fixed to the spring fixing part 210 at the left end of the slider 116.

In the embodiments of the present disclosure, a restoring force provided by the cam torsion spring 120 for driving the counterclockwise rotation of the cam 112 may be set to be greater than a restoring force of the slider spring 122 for pulling the slider 116 leftward. In this way, under the condition that the door lock assembly 100 of the present disclosure is not subjected to an external force and the slider 116 is not locked, the cam 112 has a trend to rotate counterclockwise, and thus the slider 116 has a trend to move rightward to power off the electrical apparatus. Therefore, the door hook 101 has a trend to move upwardly. That is to say, the door of the electrical apparatus has a trend to open. If the door of the electrical apparatus needs to be closed, it is necessary to apply a force toward the inside of the door so as to move the door hook 101 downwardly. The force needs to overcome the restoring force of the cam torsion spring 120 to rotate the cam 112 clockwise, and thereby the slider 116 moving leftward under the action of the restoring force of the slider spring 122 to power on the electrical apparatus.

Figure 3A:
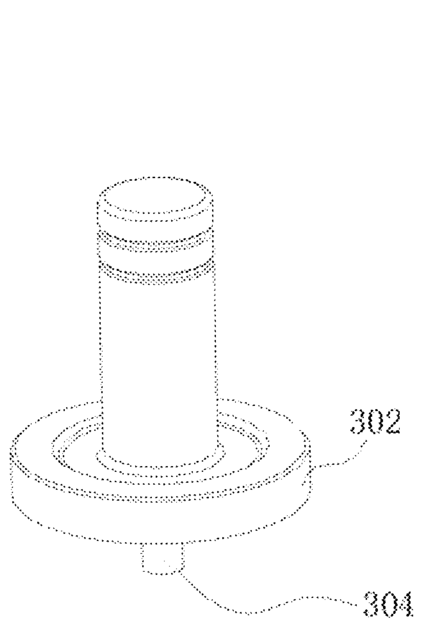
FIG. 3A is a perspective view of a pin assembly in the door lock box.
Figure 3B:
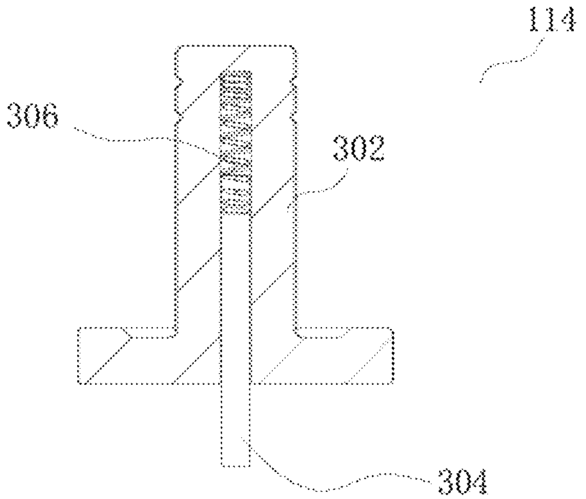
FIG. 3B is a longitudinal cross-sectional view of the pin assembly shown in FIG. 3A.

FIG. 3A is a perspective view of the pin assembly 114, and FIG. 3B is a longitudinal cross-sectional view of the pin assembly 114.

As shown in FIGS. 3A and 3B, the pin assembly 114 includes a pin housing 302 and a pin 304. The pin housing 302 is accommodated in the pin cavity 142. An upper end of the pin 304 is accommodated in the internal cavity of the pin housing 302, and a bottom end of the pin 304 protrudes from the bottom of the pin housing 302. The pin 304 moves in the heart-shaped movement path ABCDA of the slider 116 as the slider 116 moves reciprocally. However, the pin 304 can only move up and down (in the Z direction) in the internal cavity of the pin housing 302 but cannot move in other directions (e.g., the X or Y direction). The pin housing 302 is further provided with a pin spring 306 therewithin, which is located between an upper wall of the internal cavity of the pin housing 302 and the upper end of the pin 304 and configured to provide a biasing force to move the pin 304 downward. Therefore, the pin 304 has a trend to move downwardly when the pin 304 is not subjected to an external force. In the heart-shaped movement path ABCDA, since the heart first side path vertex B is located higher than the heart upper intersection C, the pin 304 can only move from the higher heart first side path vertex B to the lower heart upper intersection C when the pin 304 is not subjected to an external force, rather than reversely moving from the heart upper intersection C to the heart first side path vertex B, thereby ensuring the unidirectionality of the heart-shaped movement path ABCDA.

Referring to FIGS. 2A and 2B, since the pin cavity 142 limits the pin assembly 114 to move only in the width direction (Y direction) of the slider 116, the movement of the pin 304 in the pin assembly 114 from the heart bottom intersection A to the heart first side path vertex B of the slider 116 corresponds to the leftward movement of the slider 116 in the length direction (X direction) of the door lock box 102, the movement of the pin 304 from the heart first side path vertex B to the heart upper intersection C of the slider 116 corresponds to the rightward movement of the slider 116 in the length direction (X direction) of the door lock box 102, the movement of the pin 304 from the heart upper intersection point C to the heart second side path vertex D of the slider 116 corresponds to the leftward movement of the slider 116 in the length direction (X direction) of the door lock box 102, and the movement of the pin 304 from the heart second side path vertex D to the heart bottom intersection A of the slider 116 corresponds to the rightward movement of the slider 116 in the length direction (X direction) of the door lock box 102.

When the door of the electrical apparatus in the open position is subjected to a force acting toward the inside of the door, the door hook 101 moves downwardly, pushing the cam 112 to rotate clockwise by overcoming the restoring force of the cam torsion spring 120. The clockwise rotation of the cam 112 enables the slider 116 to move leftward under the action of the restoring force of the slider spring 122. Due to the above correspondence relationship between the movement of the pin 304 relative to the slider 116 and the movement of the slider 116 itself, the leftward movement of the cam 112 causes the pin 304 to move relative to the slider 116 from the heart bottom intersection A to the heart first side path vertex B, thereby moving the door from the open position to the closed position. When the force acting toward the inside of the door is removed, the cam 112 rotates counterclockwise under the action of the restoring force of the cam torsion spring 120, pushing the slider 116 to move rightward by a distance. The rightward movement of slider 116 causes the pin 304 to move relative to the slider 116 from the heart first side path vertex B to the heart upper intersection C under the guidance of the heart first side path ABC, so as to abut against the point C of the release guide groove 204, thereby keeping the door in the closed position.

When the door of the electrical apparatus in the closed position is subjected to a force acting toward the inside of the door, the door hook 101 moves downwardly by a distance, pushing the cam 112 to rotate clockwise by overcoming the restoring force of the cam torsion spring 120. The clockwise rotation of the cam 112 enables the slider 116 to move leftward by a distance under the action of the restoring force of the slider spring 122. The leftward movement of the slider 116 causes the pin 304 to move relative to the slider 116 from the heart upper intersection C to the heart second side path vertex D, thereby keeping the door in the closed position. After the force acting toward the inside of the door is removed, the cam 112 rotates counterclockwise under the action of the restoring force of the cam torsion spring 120, pushing the slider 116 to move rightward. The rightward movement of the slider 116 causes the pin 304 to move relative to the slider 116 to return from the heart second side path vertex D to the heart bottom intersection A under the guidance of the heart second side path CDA, thereby the door moving from the closed position to the open position.

FIGS. 4A-8B respectively show diagrams of positional relationships of the door hook 101 and the door lock box 102 and diagrams of positional relationships of the pin assembly 114 and the slider 116 when the door of the electrical apparatus is opened and closed normally. In order to show more components inside the door lock box 102, the door lock box upper cover 104 is omitted in the above diagrams.

Figure 4A:
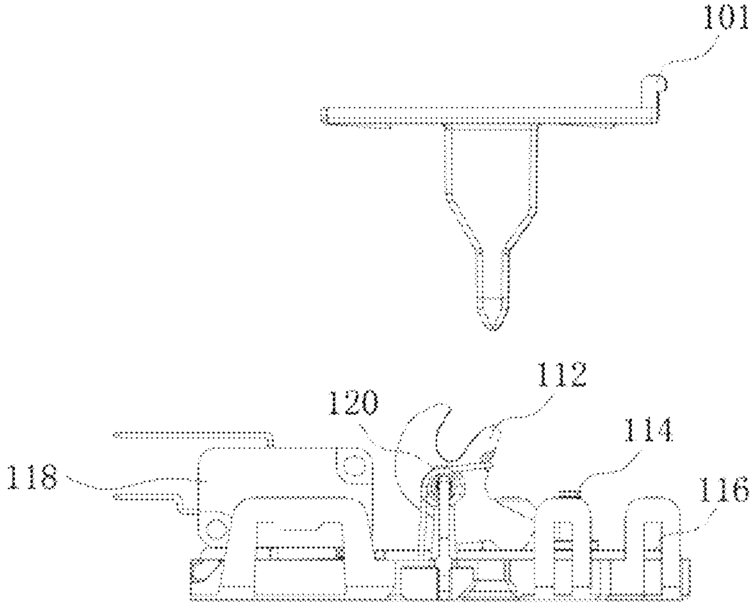
FIG. 4A shows a diagram of a positional relationship of a door hook and the door lock box when a door is in an open state.
Figure 4B:
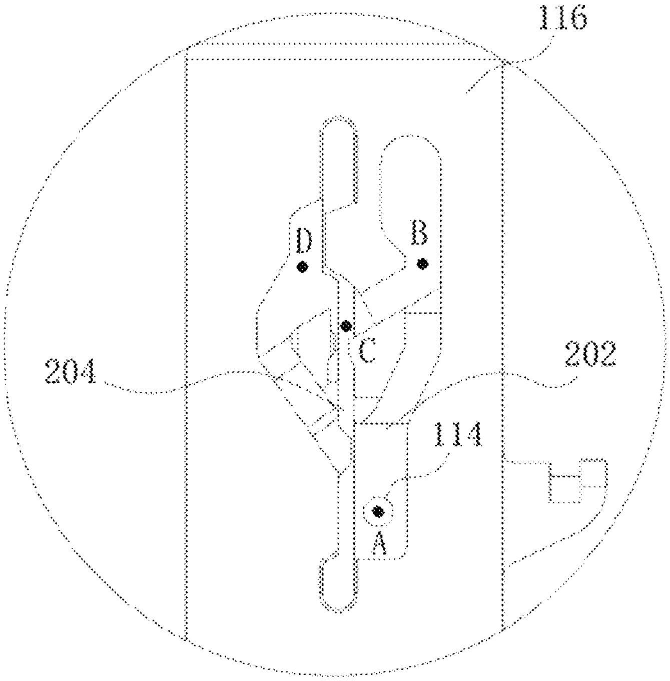
FIG. 4B shows a diagram of a positional relationship of the pin assembly and the slider when the door is in the open state.
Figure 5A:
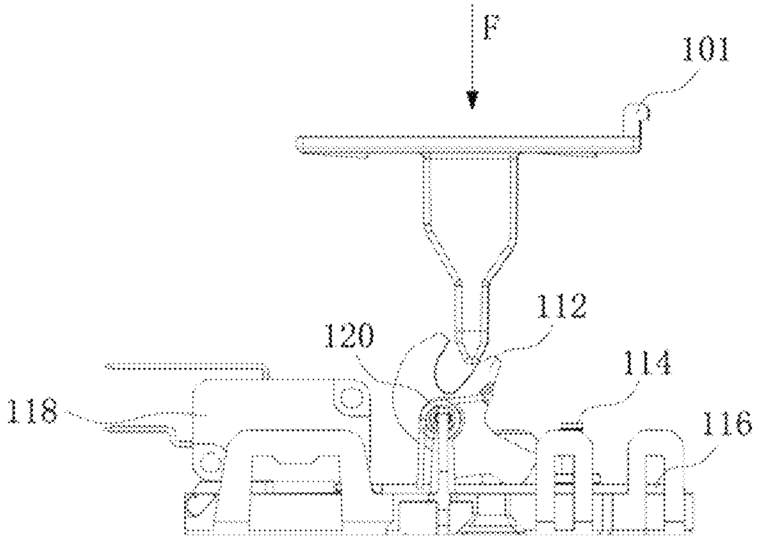
FIG. 5A shows a diagram of a positional relationship of the door hook and the door lock box when the door is about to be closed.
Figure 5B:
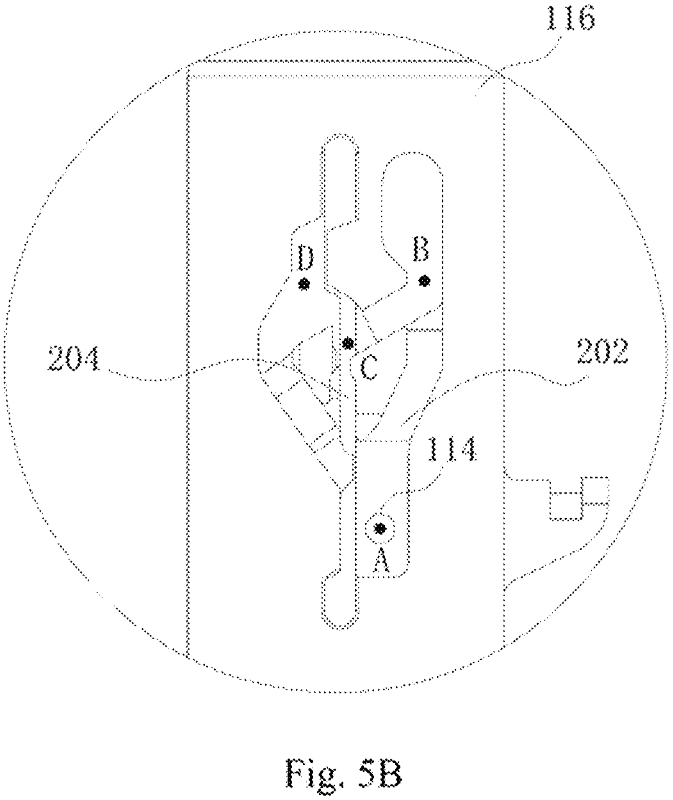
FIG. 5B shows a diagram of a positional relationship of the pin assembly and the slider when the door is about to be closed.

FIG. 4A shows a diagram of a positional relationship of the door hook 101 and the door lock box 102 when the door is in the open position, and FIG. 4B shows a diagram of a positional relationship of the pin assembly 114 and the slider 116 when the door is in the open position. FIG. 5A shows a diagram of a positional relationship of the door hook 101 and the door lock box 102 when the door is about to be closed, and FIG. 5B shows a diagram of a positional relationship of the pin assembly 114 and the slider 116 when the door is about to be closed.

As shown in FIGS. 4A and 4B, when the door is in the open position, the door hook 101 is located above the door lock box 102, the cam 112 is kept, under the action of the restoring force of the cam torsion spring 120, in an extreme position which can be reached by means of the counterclockwise rotation, the slider 116 is located at the right-most end in the door lock box 102 by means of the abutment of the cam 112, and the pin assembly 114 is located at the heart bottom intersection A of the heart-shaped guide groove 202. The micro-switch actuating part 208 of the slider 116 is out of contact with the switch contact 128 to turn off the micro-switch 118, and therefore the electrical apparatus is in a powered-off state.

When the door in the open position is subjected to force F acting toward the inside of the door, the door hook 101 moves downwardly. As shown in FIGS. 5A and 5B, when the door hook 101 moves to a position where the door hook is about to come into contact with the cam 112, the door is in a position where it is about to be closed. At this moment, the positions of the cam 112 and the slider 116 do not change relative to their positions when the door is in the open position, and the pin assembly 114 is located at the heart bottom intersection A of the heart-shaped guide groove 202.

Figure 6A:
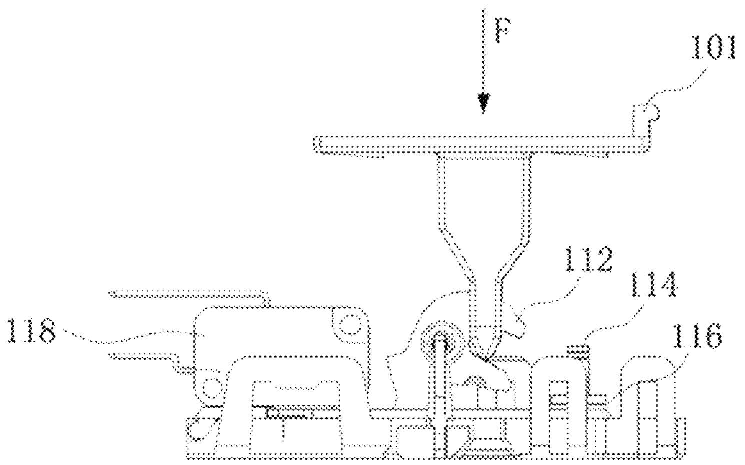
FIG. 6A shows a diagram of a positional relationship of the door hook and the door lock box when the door hook is in a maximum insertion state during the course of closing the door.
Figure 6B:
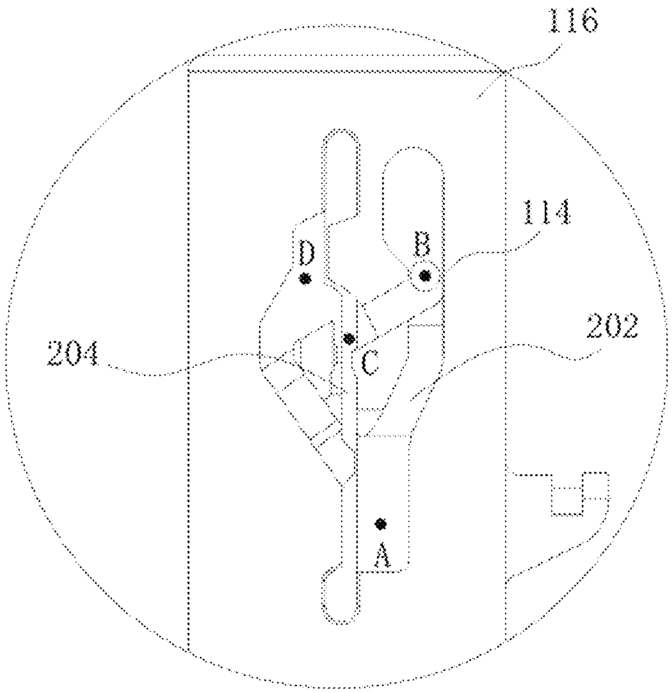
FIG. 6B shows a diagram of a positional relationship of the pin assembly and the slider when the door hook is in the maximum insertion state during the course of closing the door.

FIG. 6A shows a diagram of a positional relationship of the door hook 101 and the door lock box 102 when the door hook 101 is in the maximum insertion position during the course of closing the door, and FIG. 6B shows a diagram of a positional relationship of the pin assembly 114 and the slider 116 when the door hook 101 is in the maximum insertion position during the course of closing the door.

As shown in FIGS. 6A and 6B, if the door hook 101 is subjected to a sustained force F acting toward the inside of the door when the door hook 101 is in the position where the door hook comes into contact with the cam 112, the door hook 101 continues to move downwardly, pushing the cam 112 to rotate clockwise by overcoming the restoring force of the cam torsion spring 120. The clockwise rotation of the cam 112 enables the slider 116 to move leftward under the action of the restoring force of the slider spring 122, triggering the switch contact 128 to turn on the micro-switch 118, and thus the electrical apparatus is powered on. At this moment, the pin assembly 114 reaches the heart first side path vertex B by moving relative to the slider 116 from the heart bottom intersection A, the door reaches the closed position by moving from the open position, and the door hook 101 is in the maximum insertion position.

Figure 7A:
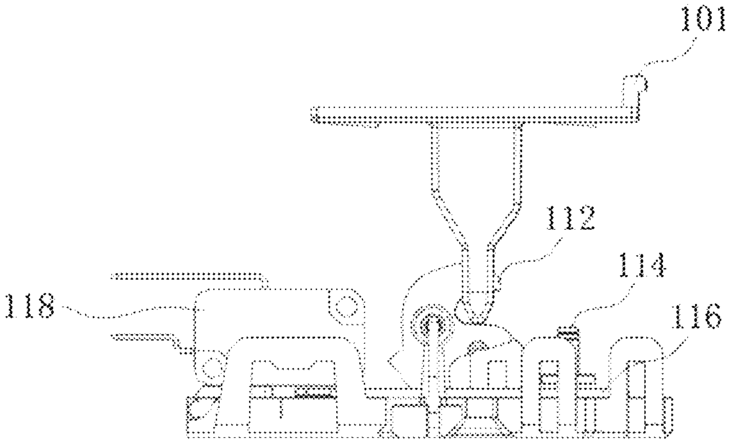
FIG. 7A shows a diagram of a positional relationship of the door hook and the door lock box when the door is in a closed state.
Figure 7B:
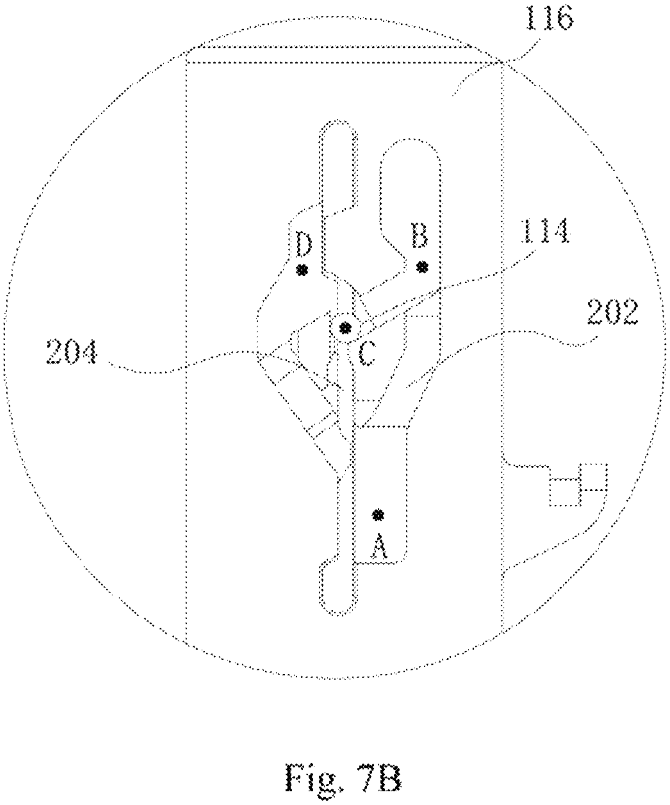
FIG. 7B shows a diagram of a positional relationship of the pin assembly and the slider when the door is in the closed state.

FIG. 7A shows a diagram of a positional relationship of the door hook 101 and the door lock box 102 when the door is in the closed position, and FIG. 7B shows a diagram of a positional relationship of the pin assembly 114 and the slider 116 when the door is in the closed position.

As shown in FIGS. 7A and 7B, if the force F acting toward the inside of the door is removed when the door hook 101 is in the maximum insertion position as shown in FIGS. 6A and 6B, the cam 112 rotates counterclockwise under the action of the restoring force of the cam torsion spring 120, pushing the slider 116 to move rightward by a distance (the distance is equal to the distance between the point B and the point C in the length direction of the slider). The rightward movement of the slider causes the pin assembly 114 to move relative to the slider 116 from the heart first side path vertex B to the heart upper intersection C under the guidance of the heart first side path ABC to abut against the point C of the release guide groove 204, thereby keeping the door in the closed position. In addition, the door hook 101 moves upwardly from the maximum insertion position to a normal insertion position under the drive of the cam 112. In this process, the distance by which the slider 116 moves rightward is not enough to enable the micro-switch actuating part 208 of the slider 116 to move out of contact with the switch contact 128, and thus the electrical apparatus remains in a powered-on state.

Figure 8A:
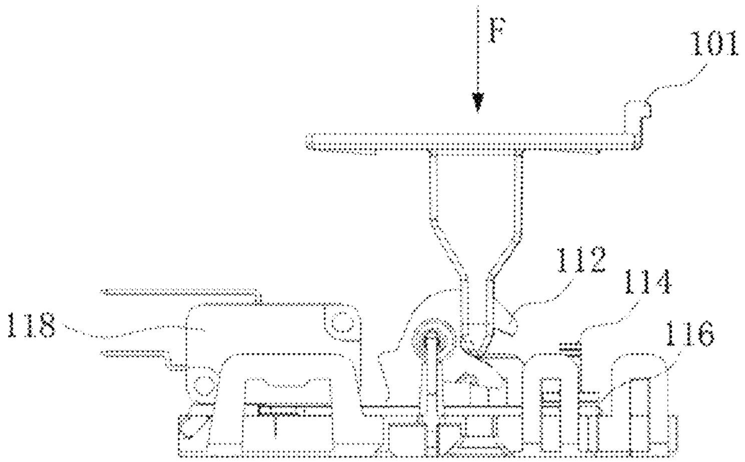
FIG. 8A shows a diagram of a positional relationship of the door hook and the door lock box when the door hook is in the maximum insertion state during the course of opening the door.
Figure 8B:
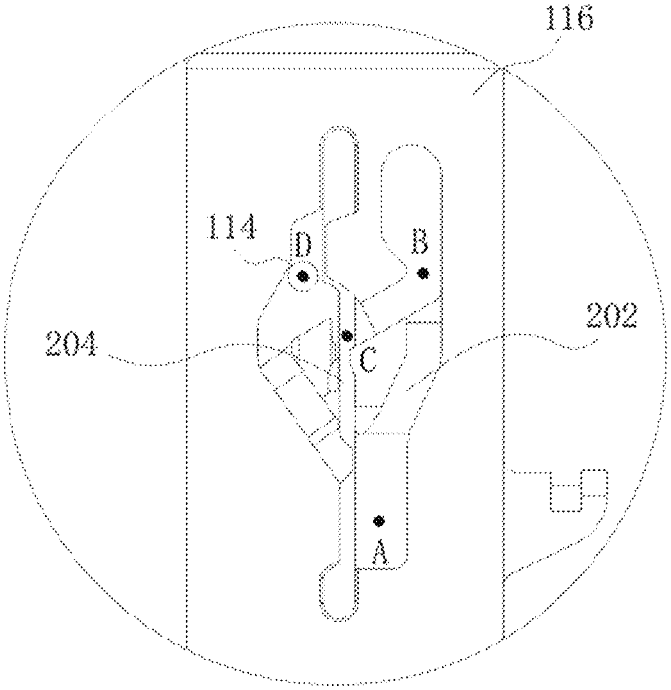
FIG. 8B shows a diagram of a positional relationship of the pin assembly and the slider when the door hook is in the maximum insertion state during the course of opening the door.

FIG. 8A shows a diagram of a positional relationship of the door hook 101 and the door lock box 102 when the door hook 101 is in the maximum insertion position during the course of opening the door, and FIG. 8B shows a diagram of a positional relationship of the pin assembly 114 and the slider 116 when the door hook 101 is in the maximum insertion position during the course of opening the door.

As shown in FIGS. 8A and 8B, if the door of the electrical apparatus is subjected to the force F acting toward the inside of the door again when the door of the electrical apparatus is in the closed position, the door hook 101 moves downwardly by a distance (the distance is equal to the distance between the point C and the point D in the length direction of the slider) under the action of the force F, pushing the cam 112 to rotate clockwise by overcoming the restoring force of the cam torsion spring 120. The clockwise rotation of the cam 112 enables the slider 116 to move leftward by a distance under the action of the restoring force of the slider spring 122. The leftward movement of the slider 116 causes the pin assembly 114 to reach the heart second side path vertex D by moving relative to the slider 116 from the heart upper intersection C, thereby keeping the door in the closed position and moving the door hook 101 from the normal insertion position to the maximum insertion position again.

After the force F acting toward the inside of the door is removed, the cam 112 rotates counterclockwise under the action of the restoring force of the cam torsion spring 120, pushing the slider 116 to move rightward. Thus, the microswitch actuating part 208 of the slider 116 moves out of contact with the switch contact 128 to turn off the microswitch 118, and thus the electrical apparatus is powered off. At this moment, the pin assembly 114 reaches the heart bottom intersection A by moving relative to the slider 116 from the heart second side path vertex D under the guidance of the second side path CDA of the heart shape, thereby the door reaching the open position shown in FIGS. 5A and 5B by moving from the closed position.

Figure 9A:
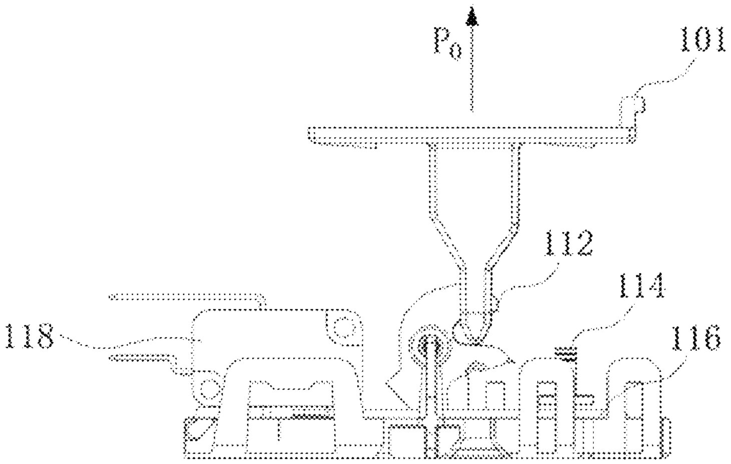
FIG. 9A shows a diagram of a positional relationship of the door hook and the door lock box when the door in the closed state is subjected to an outward force.
Figure 9B:
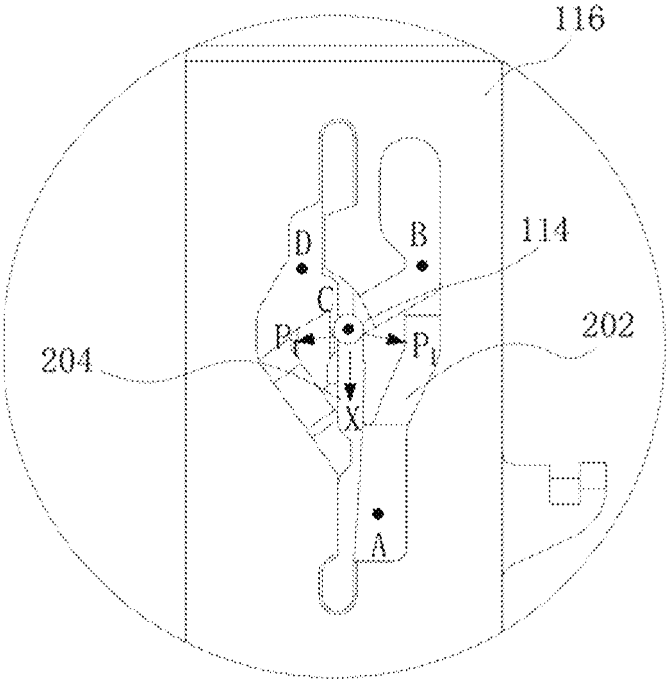
FIG. 9B shows a diagram of a positional relationship of the pin assembly and the slider when the door in the closed state is subjected to the outward force.

FIG. 9A shows a diagram of a positional relationship of the door hook 101 and the door lock box 102 when the door in the closed position is subjected to an outward force, and FIG. 9B shows a diagram of a positional relationship of the pin assembly 114 and the slider 116 when the door in the closed position is subjected to an outward force.

In the prior art, the slider 116 of the door lock assembly is provided with only the heart-shaped guide groove 202 that defines the unidirectional heart-shaped movement path ABCDA, but without the release guide groove 204 that defines the alternative movement path CA. Therefore, when the door is in the closed position, the pin assembly 114 is located at the heart upper intersection C. At this moment, if the door is subjected to a force P0 (e.g., an outward pushing force applied by a child in a drum of a dryer) acting toward the outside of the door, the door hook 101 pulls the cam 112 outwardly, causing the cam 112 to have a trend to rotate counterclockwise, and thus driving the slider 116 to have a trend to move rightward. The trend of rightward movement of the slider 116 causes the pin assembly 114 to compress the slider 116 at the heart upper intersection C of the heart-shaped guide groove 202. Since there is no additional movement space (movement path) at the heart upper intersection C, the pin assembly 114 is blocked at the heart upper intersection C and cannot move relative to the slider 116. Thus, the slider 116 is locked, the cam 112 is locked by the slider 116, and the door hook 101 is locked by the cam 116 and cannot be pulled out, blocking the door from being opened normally. Therefore, if a child accidentally enters the dryer in the prior art and is locked in the drum of the dryer, the door cannot be opened by applying a pushing force from the inside of the door, and thus the child may be faced with the risk of asphyxiation.

In contrast, in the present disclosure, as shown in FIGS. 9A and 9B, the slider 116 is not only provided with the heart-shaped guide groove 202 that defines the unidirectional heart-shaped movement path ABCDA, but is also provided with the release guide groove 204 that defines the alternative movement path CA. When the door is in the closed position, the pin assembly 114 is located at the heart upper intersection C. When the door is subjected to the force P0 (for example, the outward pushing force applied by the child in the drum of the dryer) acting toward the outside of the door, the door hook 101 pulls the cam 112 outwardly, causing the cam 112 to have a trend to rotate counterclockwise, thereby driving the slider 116 to have a trend to move rightward. The trend of rightward movement of the slider 116 causes the pin assembly 114 to compresses the release guide groove 204 of the slider 116 at the heart upper intersection C, and then the pin assembly 114 compresses the release guide groove 204 of the slider 116 toward the heart bottom intersection A. The compression by the pin assembly 114 transfers as a compressive force P1 toward the two side walls of the release guide groove 204. When the compressive force is large enough (e.g., 55 Newtons), the groove width of the release guide groove 204 may be expanded to be sufficient to accommodate the end of the pin 304 of the pin assembly 114 (i.e., the groove width is greater than the diameter of the end of the pin 304), so that the slider 116 can move rightward relative to the pin 304 of the pin assembly 114. After the slider 116 moves rightward, the abutment of the cam abutment part 212 of the slider 116 against the slider actuating part 155 of the cam 112 is released, the counterclockwise rotation of the cam 112 is thus unblocked. The counterclockwise rotation of the cam 112 allows to release the door hook 101, and finally the door can be opened. During the above process, the pin assembly 114 moves in the release guide groove 204 of the slider 116 from the heart upper intersection C to the heart bottom intersection A. After the pin assembly 114 moves through the release guide groove 204, the release guide groove 204 is released from being compressed, and the release guide groove 204 and the groove width thereof can be elastically restored to the original size.

It can be seen that if the child accidentally enters the dryer provided with the door lock assembly of the present disclosure and is locked in the drum of the dryer, the door can be pushed open by applying a pushing force from the inside of the door. The force required to push the door open (pushing-force threshold) may be set or adjusted by means of the following method.

In an embodiment of the present disclosure, in order to more easily push the door open from the inside, the release guide groove 204 is designed as a hollow linear guide groove penetrating the slider 116 to enable the release guide groove 204 to deform more easily so as to make the alternative movement path CA passable. However, for those of at least ordinary skill in the art, the release guide groove 204 could be designed as a non-hollow guide groove (see the embodiment shown in FIGS. 11A and 11B), and the release guide groove of the slider could deform under a predetermined force by using a suitable material.

Figure 10A:
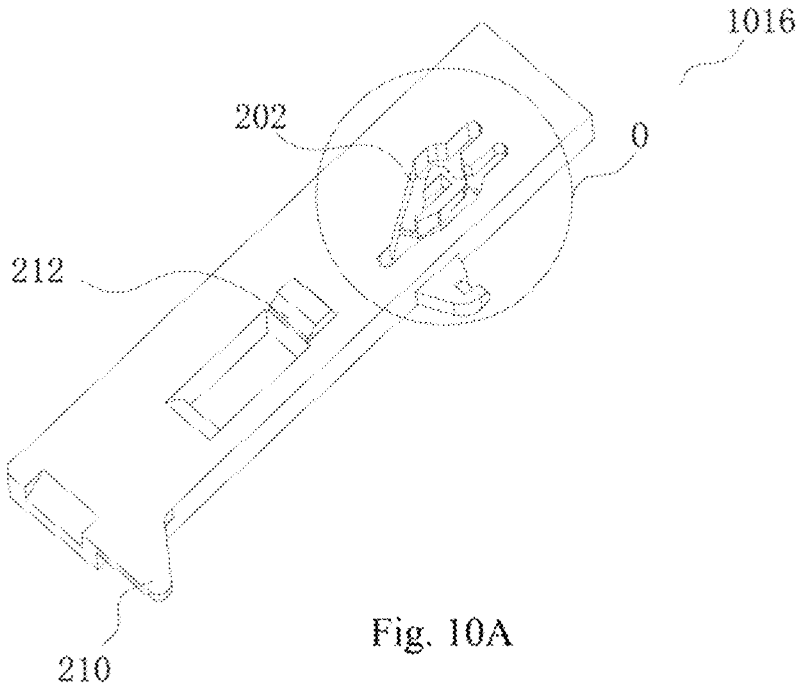
FIG. 10A is a perspective view of a further embodiment of the slider in the door lock box.
Figure 10B:
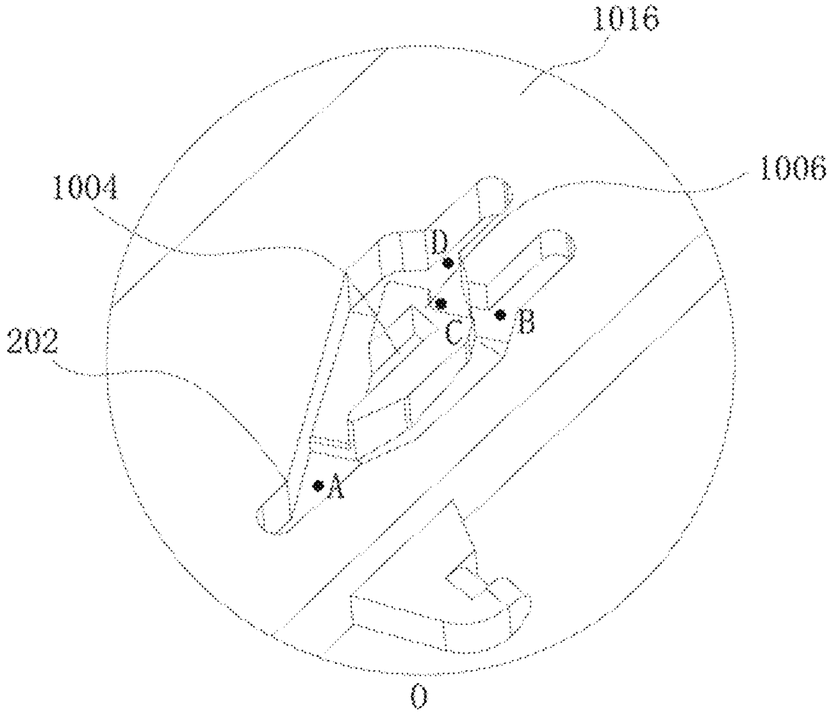
FIG. 10B is an enlarged view for the portion O of the further embodiment of the slider shown in FIG. 10A.

FIG. 10A is a perspective view of a further embodiment 1016 of the slider 116 in the door lock box 102, and FIG. 10B is an enlarged view of the portion O of the further embodiment 1016 of the slider 116 shown in FIG. 10A. The structure of the slider 1016 shown in FIGS. 10A and 10B is substantially the same as that of the slider 116 shown in FIGS. 2A and 2B, the only difference lies in the structural difference of the release guide grooves, and the parts of the same structures of the sliders will not be described in detail.

As shown in FIGS. 10A and 10B, the release guide groove 1004 of the slider 1016 is wider than the release guide groove 204 of the slider 116 as shown in FIGS. 2A and 2B, and the release guide groove 1004 is wide enough to accommodate the pin 304. That is to say, the groove width of the release guide groove 1004 is not less than the diameter of the end of the pin 304. The release guide groove 1004 is provided with a baffle 1006 near the heart upper intersection C. When the door is in the closed position and subjected to force acting toward the outside of the door, the pin 304 of the pin assembly 114 can apply a compressive force to the baffle 1006. When the compressive force exceeds a threshold (e.g., 55 Newtons) that the baffle 1006 can withstand, the baffle 1006 is destroyed, such that the pin 304 can move in the release guide groove 1004 from the heart upper intersection C to the heart bottom intersection A. The threshold of the compressive force that the baffle 1006 can withstand may be set by setting a suitable thickness of the baffle.

Figure 11A:
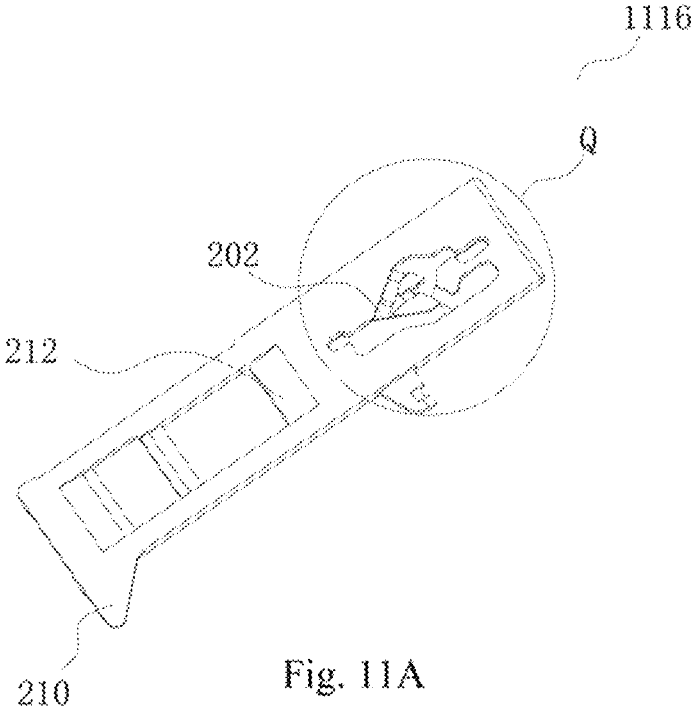
FIG. 11A is a perspective view of a still further embodiment of the slider in the door lock box.
Figure 11B:
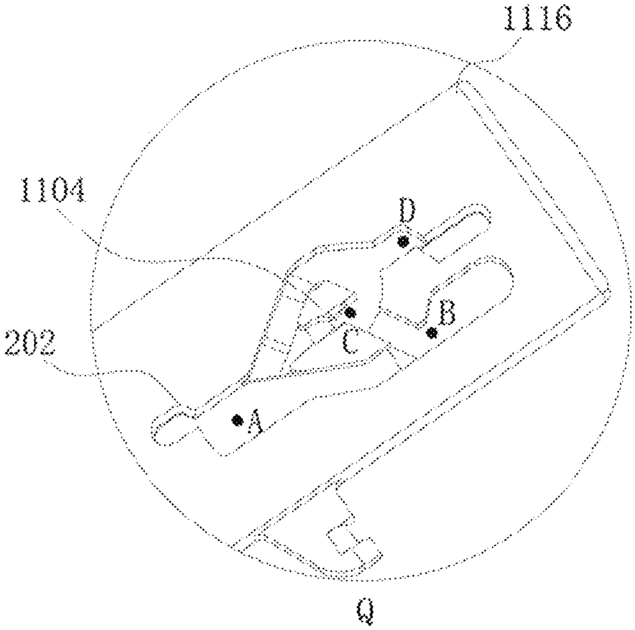
FIG. 11B is an enlarged view for the portion Q of the still further embodiment of the slider shown in FIG. 11A.

FIG. 11A is a perspective view of a still further embodiment 1116 of the slider 116 in the door lock box 102, and FIG. 11B is an enlarged view of the portion Q of the still further embodiment 1116 of the slider 116 shown in FIG. 11A. The structure of the slider 1116 shown in FIGS. 11A and 11B is substantially the same as that of the slider 116 shown in FIGS. 2A and 2B, the only difference lies in that the release guide groove is a non-hollow groove, and the parts of the same structures of the sliders will not be described in detail. Even if the release guide groove is a non-hollow groove, the deformation of the release guide groove 1104 under a predetermined force is achievable by using a suitable material. Therefore, the pin 304 can move in the release guide groove 1104 from the heart upper intersection C to the heart bottom intersection A.

Figure 12:
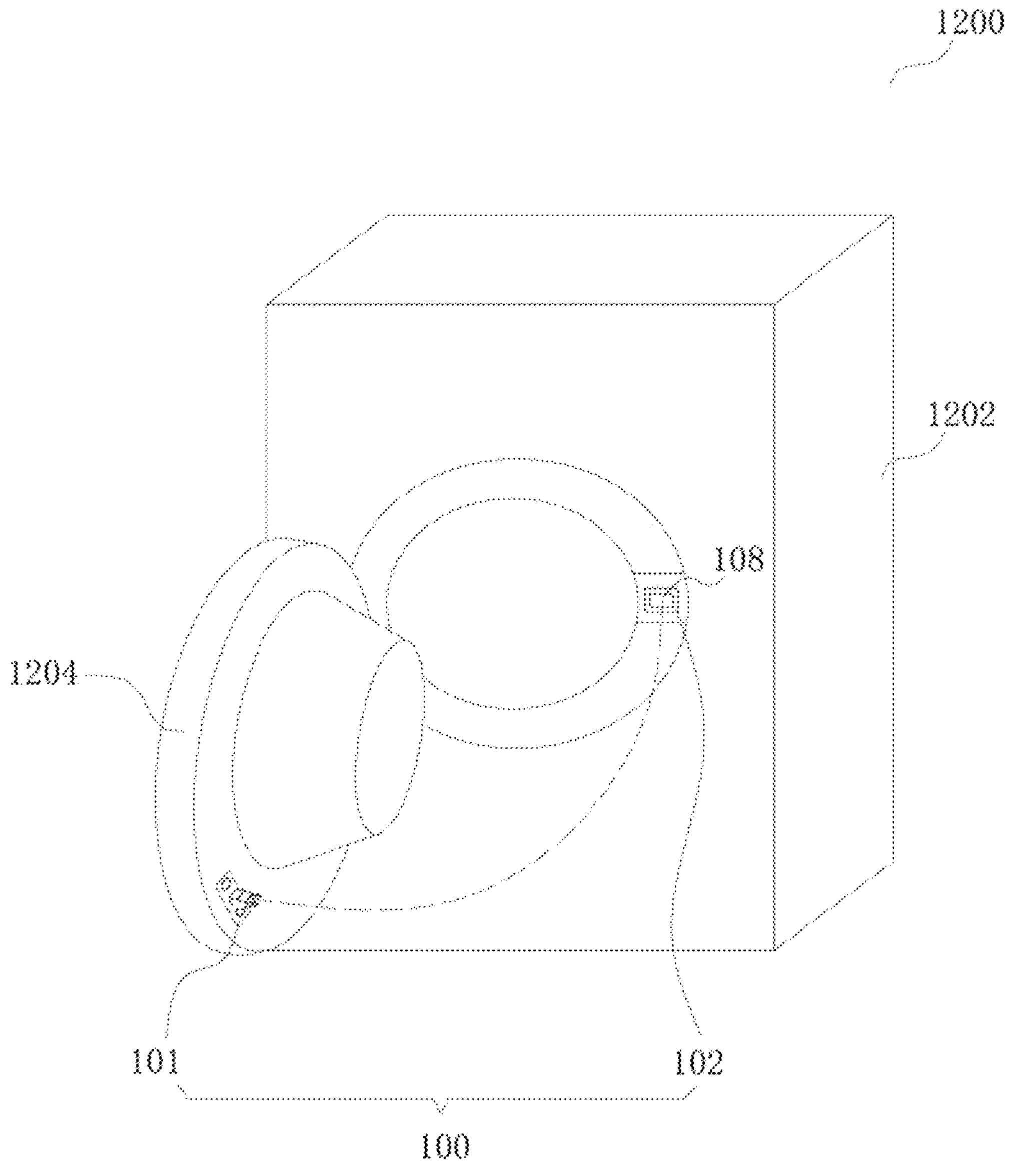
FIG. 12 is a schematic diagram of a dryer provided with a door lock assembly of the present disclosure when a door is in an open position.

FIG. 12 is a schematic diagram of a dryer 1200 provided with the door lock assembly 100 of the present disclosure when a door is in an open position.

As shown in FIG. 12, the dryer 1200 is provided with a dryer body 1202, a door 1204, and the door lock assembly 100. The door hook 101 is disposed on an inner side of the door 1204, and the door lock box 102 is disposed on the dryer body 1202 corresponding to the door hook 101. By closing the door 1204, the door hook 101 can pass through the door locking hole 108 to engage with the door lock box 102.

The dryer 1200 shown in FIG. 12 is merely exemplary, and the door lock assembly 100 of the present disclosure may also be mounted on various electrical apparatuses each having a cavity and a door for closing the cavity, such as a washing machine, a dishwasher, and a microwave oven, and may also be mounted on other non-electrical apparatuses.

The objective of the present disclosure is to at least partially solve the foregoing technical problem.

Compared with a door lock in the prior art, the door lock assembly of the present disclosure at least has the following beneficial technical effects.

In some commercial or domestic electrical apparatuses, the door lock assemblies need to be provided with safety mechanisms for protecting children. For example, with regard to the door lock mechanism for a dryer which is provided with a door disposed on a side surface, if accidentally entering a drum of the dryer, a child can push, with a relatively small force, the closed or locked door open from the inside of the door, so that the child can easily come out of the rotary drum of the dryer.

The present disclosure provides a door lock assembly, which has a simple structure being neither provided with additional components compared with the door lock assembly in the prior art, nor changing the arrangement of the components inside the door lock box in the prior art. Without affecting the conventional functions of the door lock assembly in the prior art (including but not limited to applying a pushing force twice from the outside of a door to open/close the door), the present disclosure can achieve a function and advantageous technical effect of pushing a door open from the inside by providing an additional release guide groove in the heart-shaped guide groove of the slider. By reasonably setting the width of the release guide groove, reasonably setting the thickness of the baffle, or by selecting a material, the pushing-force threshold of pushing the door open from the inside can be adjusted conveniently and quickly, so that it is easier to manufacture and machine the slider.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. In addition, the technical effects and/or technical problems described in the present disclosure are illustrative rather than restrictive. Therefore, the disclosed description in the present disclosure may be used for solving other technical problems and have other technical effects and/or can solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or basic equivalents.

The invention claimed is:

1. A door lock assembly (100) for locking a door of an electrical apparatus comprising:

a cam (112) configured to rotate clockwise or counterclockwise about a camshaft (124);

a slider (116) configured to fit and engage with the cam (112), such that when the cam (112) rotates clockwise or counterclockwise, the slider (116) can reciprocate in the length direction of the slider (116) along with the rotation of the cam (112), wherein the slider (116) is provided with a movement guide groove (202) defining a conventional movement path (ABCDA) which includes a first segment (ABC) of the conventional movement path and a second segment (CDA) of the conventional movement path, the first segment (ABC) of the conventional movement path and the second segment (CDA) of the conventional movement path being connected to each other; and a pin assembly (114) configured such that an end of the pin assembly (114) can move relative to the slider (116) in the conventional movement path (ABCDA) defined by the movement guide groove (202) as the slider (116) moves reciprocally;

wherein, the movement guide groove (202) further defines an alternative movement path (CA), and the pin assembly (114) is further configured such that the end of the pin assembly (114) can move relative to the slider (116) in the first segment (ABC) of the conventional movement path and the alternative movement path (CA) defined by the movement guide groove (202) as the slider (116) moves reciprocally, but does not move in the second segment (CDA) of the conventional movement path.

2. The door lock assembly as claimed in claim 1, wherein the movement guide groove is a heart-shaped guide groove (202), and the conventional movement path (ABCDA) is a heart-shaped movement path (ABCDA), four path points being provided on the heart-shaped movement path (ABCDA), sequentially including: a heart bottom intersection A, a heart first side path vertex B, a heart upper intersection C, and a heart second side path vertex D;

wherein the alternative movement path (CA) is disposed between the heart upper intersection C and the heart bottom intersection A, such that the pin assembly (114) can directly move from the heart upper intersection C to the heart bottom intersection A without passing through the heart second side path vertex D.

3. The door lock assembly as claimed in claim 2, wherein the first segment (ABC) of the conventional movement path is a heart first side path (ABC), and the second segment (CDA) of the conventional movement path is a heart second side path (CDA);

wherein the heart first side path (ABC) is formed from the heart bottom intersection A to the heart upper intersection C through the heart first side path vertex B, the heart second side path (CDA) is formed from the heart upper intersection C to the heart bottom intersection A through the heart second side path vertex D, the heart first side path (ABC) and the heart second side path (CDA) are out-protruding movement paths, and the heart first side path vertex B and the heart second side path vertex D are respectively the highest protruding points of the heart first side path (ABC) and the heart second side path (CDA), and concaved paths are formed from the heart first side path vertex B to the heart upper intersection C, and from heart upper intersection C to the heart second side path vertex D.

4. The door lock assembly as claimed in claim 3, wherein the heart-shaped movement path (ABCDA) is a unidirectional movement path, and the movement in the heart-shaped movement path sequentially passes through the heart bottom intersection A, the heart first side path vertex B, the heart upper intersection C, and the heart second side path vertex D, and finally returns to the heart bottom intersection A.

5. The door lock assembly as claimed in claim 2, wherein the pin assembly (114) is located at the heart bottom intersection A when the door is in an open position;

the pin assembly (114) is located at the heart upper intersection C when the door is in a closed position; and the pin assembly (114) is located at the heart first side path vertex B or the heart second side path vertex D when a door hook (101) of the door is in the maximum insertion position;

wherein:

the pin assembly (114) moves from the heart bottom intersection A to the heart first side path vertex B and the door hook (101) moves to the maximum insertion position when the door is subjected to a first inward force in the open position, the pin assembly (114) moves from the heart first side path vertex B to the heart upper intersection C and the door moves to the closed position after the first inward force is removed, the pin assembly (114) moves from the heart upper intersection C to the heart second side path vertex D and the door hook (101) moves again to the maximum insertion position when the door is subjected to a second inward force in the closed position, and the pin assembly (114) moves from the heart second side path vertex D back to the heart bottom intersection A and the door returns to the open position after the second inward force is removed.

6. The door lock assembly as claimed in claim 5, wherein the alternative movement path (CA) is a release guide groove (204,1004) provided on the slider (116).

7. The door lock assembly as claimed in claim 1, wherein the electrical apparatus is a dryer.

8. A door lock assembly (100) for locking a door of an electrical apparatus comprising:

a cam (112) configured to rotate clockwise or counterclockwise about a camshaft (124);

a slider (116) configured to fit and engage with the cam (112), such that when the cam (112) rotates clockwise or counterclockwise, the slider (116) can reciprocate in the length direction of the slider (116) along with the rotation of the cam (112), wherein the slider (116) is provided with a movement guide groove (202) defining a conventional movement path (ABCDA) which includes a first segment (ABC) of the conventional movement path and a second segment (CDA) of the conventional movement path, the first segment (ABC) of the conventional movement path and the second segment (CDA) of the conventional movement path being connected to each other; and a pin assembly (114) configured such that an end of the pin assembly (114) can move relative to the slider (116) in the conventional movement path (ABCDA) defined by the movement guide groove (202) as the slider (116) moves reciprocally;

wherein, the movement guide groove (202) further defines an alternative movement path (CA), and the pin assembly (114) is further configured such that the end of the pin assembly (114) can move relative to the slider (116) in the first segment (ABC) of the conventional movement path and the alternative movement path (CA) defined by the movement guide groove (202) as the slider (116) moves reciprocally, but does not move in the second segment (CDA) of the conventional movement path;

wherein the alternative movement path (CA) is a release guide groove provided on the slider (116), and the diameter of the end of the pin assembly (114) is greater than the groove width of the release guide groove (204), when the door is in the closed position and subjected to an outward force, the pin assembly (114) is configured to apply compressive force to two side walls of the release guide groove (204), thereby expanding the release guide groove (204) in the groove width direction, such that the pin assembly (114) can move in the release guide groove (204).

9. The door lock assembly as claimed in claim 8, wherein when the door is in the closed position and subjected to an outward force, the door hook (101) of the door pulling the cam (112) outwardly makes the cam (112) have a trend to rotate counterclockwise, thereby driving the slider (116) to trend to move in a first direction, so that the pin assembly (114) can compress the release guide groove (204) of the slider (116) at the heart upper intersection C, enabling the pin assembly (114) to compress the release guide groove (204) of the slider (116) toward the heart bottom intersection A, thereby transferring into a compressive force toward the two side walls of the release guide groove (204), the compressive force compressing to expand the groove width of the release guide groove (204) to be sufficient to accommodate the end of the pin assembly (114), so that the slider (116) can move relative to the pin assembly (114) in the first direction, without blocking the counterclockwise rotation of the cam (112), ultimately allowing the door to open, and at the same time, the pin assembly (114) moves in the release guide groove (204) of the slider (116) from the heart upper intersection C to the heart bottom intersection A.

10. The door lock assembly as claimed in claim 9, wherein the release guide groove (204) is one of a hollow groove and a non-hollow groove.

11. The door lock assembly as claimed in claim 9, wherein the release guide groove (204) is a linear guide groove.

12. A door lock assembly (100) for locking a door of an electrical apparatus comprising:

a cam (112) configured to rotate clockwise or counterclockwise about a camshaft (124);

a slider (116) configured to fit and engage with the cam (112), such that when the cam (112) rotates clockwise or counterclockwise, the slider (116) can reciprocate in the length direction of the slider (116) along with the rotation of the cam (112), wherein the slider (116) is provided with a movement guide groove (202) defining a conventional movement path (ABCDA) which includes a first segment (ABC) of the conventional movement path and a second segment (CDA) of the conventional movement path, the first segment (ABC) of the conventional movement path and the second segment (CDA) of the conventional movement path being connected to each other; and a pin assembly (114) configured such that an end of the pin assembly (114) can move relative to the slider (116) in the conventional movement path (ABCDA) defined by the movement guide groove (202) as the slider (116) moves reciprocally;

wherein, the movement guide groove (202) further defines an alternative movement path (CA), and the pin assembly (114) is further configured such that the end of the pin assembly (114) can move relative to the slider (116) in the first segment (ABC) of the conventional movement path and the alternative movement path (CA) defined by the movement guide groove (202) as the slider (116) moves reciprocally, but does not move in the second segment (CDA) of the conventional movement path;

wherein the alternative movement path (CA) is a release guide groove provided on the slider (116), and the release guide groove (1004) is provided with a baffle (1006) near the heart upper intersection C, and the pin assembly (114) is configured to apply force to the baffle (1006), wherein the baffle (1006) is destroyed when the force applied to the baffle (1006) exceeds a threshold that the baffle (1006) can withstand, such that the pin assembly (114) can move in the release guide groove (1004).

13. The door lock assembly as claimed in claim 12, further comprising:

a housing (104,106), wherein the cam (112), the slider (116) and the pin assembly (114) are disposed inside the housing (104,106).

14. The door lock assembly as claimed in claim 13, wherein the pin assembly (114) includes a pin housing (302) and a pin (304), a portion of the pin (304) is accommodated in the pin housing (302), and the bottom end of the pin (304) protrudes from the bottom of the pin housing (302), wherein the pin (304) is configured to move in the heart-shaped movement path (ABCDA).

15. The door lock assembly as claimed in claim 14, wherein the housing (104,106) has a pin cavity (142) in which the pin housing (302) is accommodated, wherein the pin cavity (142) is configured to restrict the movement of the pin assembly (114) within the pin cavity (142) in the length direction of the slider (116), but allow the pin assembly (114) to move within the pin cavity (142) in the width direction of the slider (116).

16. The door lock assembly as claimed in claim 15, wherein the cam (112) includes a lock hook (152,154,156) configured to engage with the door hook (101) so as to lock the door hook (101), and the door hook (101) being mounted on the door;

wherein the door hook (101) is configured to engage with or disengage from the lock hook (152,154,156) when the door is closed or opened, thereby allowing the cam (112) to rotate clockwise or counterclockwise.

17. The door lock assembly as claimed in claim 16, wherein the housing (104, 106) is provided with a locking hole (108) which the door hook (101) passes through to engage with the lock hook (152,154,156).

18. The door lock assembly as claimed in claim 17, further comprising:

a micro-switch (118) disposed in the housing (104,106);

wherein the micro-switch (118) is in an off state when the door is in the open position, wherein the pin (304) moves along the first side path (ABC) from the heart bottom intersection A to the heart upper intersection C and the micro-switch (118) is turned on during the course of closing the door, and the pin (304) moves along the second side path (CDA) from the heart upper intersection C to the heart bottom intersection A and the micro-switch (118) is turned off during the course of opening the door.

19. The door lock assembly as claimed in claim 18, wherein the slider (116) has a micro-switch actuating part (208) disposed at one end thereof, wherein the clockwise rotation of the cam (112) causes the movement of the slider (116) in a second direction to be unblocked during the course of closing the door, thereby allowing the slider (116) to move in the second direction, causing the micro-switch actuating part (208) to trigger the micro-switch (118), thereby enabling the micro-switch (118) to be turned on, or wherein the counterclockwise rotation of the cam (112) drives the slider (116) to move in the first direction during the course of opening the door, allowing the micro-switch actuating part (208) to disengage from the micro-switch (118), thereby enabling the micro-switch (118) to be turned off.

20. The door lock assembly as claimed in claim 19, further comprising:

a cam torsion spring (120) configured to engage with the cam (112) to provide a driving force driving the cam (112) to rotate counterclockwise, and a slider spring (122) configured to engage with the slider (116) to provide a driving force driving the slider (116) to move in the second direction.

* * * * *